United States Patent

[11] 3,595,352

| [72] | Inventor | Eugenio Todeschini<br>Via Sirotti, Italy |
|---|---|---|
| [21] | Appl. No. | 823,664 |
| [22] | Filed | May 12, 1969 |
| [45] | Patented | July 27, 1971 |
| [73] | Assignee | Massey-Ferguson Services<br>N.V. Curacao, Netherlands |
| [32] | Priority | May 24, 1968 |
| [33] | | Italy |
| [31] | | 16893A/68 |

[54] CLUTCH AND BRAKE WITH PRESSURE OPERATED SEQUENCING VALVE
5 Claims, 5 Drawing Figs.

[52] U.S. Cl.................................................. 192/13 R,
192/12 C, 180/6.7, 91/412, 137/625.69, 137/118, 137/538
[51] Int. Cl......................................................F16d 67/04
[50] Field of Search........................................... 192/12 C, 13; 180/6.7

[56] References Cited
UNITED STATES PATENTS

| 2,817,426 | 12/1957 | Clark et al. .................. | 192/13 |
| 2,897,787 | 8/1959 | Kivisto et al. .................. | 192/13 UX |
| 3,020,721 | 2/1962 | Hipp.............................. | 192/13 UX |
| 3,374,846 | 3/1968 | Massone........................ | 192/13 X |

*Primary Examiner*—Benjamin W. Wyche
*Attorney*—Gerhardt, Greenlee, Farris

ABSTRACT: Each track of a crawler vehicle is provided with a hydraulically operated drive clutch and brake. A control valve and a pilot operated sequencing relief valve are provided to operate each clutch and brake set. These valves operate to fully disengage the clutches before the brakes are applied and to fully release the brakes before the clutches are reengaged to minimize wear on the clutches and brakes. The relief valve is movable between clutch and brake operating positions and is responsive to completion of these operations to control the supply of hydraulic fluid to the control valve.

Inventor
EUGENIO TODESCHINI
BY Tweedale & Gerhardt
Attorneys

CLUTCH AND BRAKE WITH PRESSURE OPERATED SEQUENCING VALVE

This invention relates to a steering and braking system for a crawler vehicle.

The use of control members, handles or pedals, for the purpose of controlling movements of a crawler tractor which has no differential drive gear is known. Further, crawler tractors have single control members in which initial movement disconnects the drive to one track and subsequent movement of the control member applies a brake to that track have also been used. It is necessary to disconnect the drive to the track before the brake is applied, otherwise wear of certain parts will be very rapid.

An object of the present invention is to ensure that the sequenced operations of drive disconnection and brake application occur quite separately one before the other, and that brake release is entirely completed before connection of the drive.

According to the present invention, we provide a steering and braking system for a crawler vehicle in which each crawler track is provided with a clutch for disconnecting the drive and a brake for braking the track, comprising a control valve movable by muscular effort successively initially to a first position for initiating declutching movement of a hydraulic declutch actuator, and subsequently to a second position for applying the brakes, a sequencing pilot-operated relief valve having a pilot pressure connection to said declutch actuator, a connection to a source of high pressure oil and a connection to a brake actuator controlled by said control valve, said connection to the brake actuator constituting a first spill passage from said pilot-operated relief valve.

An embodiment of the invention will now be described, by way of example, with reference to the accompanying drawings, in which.

Figure 2:
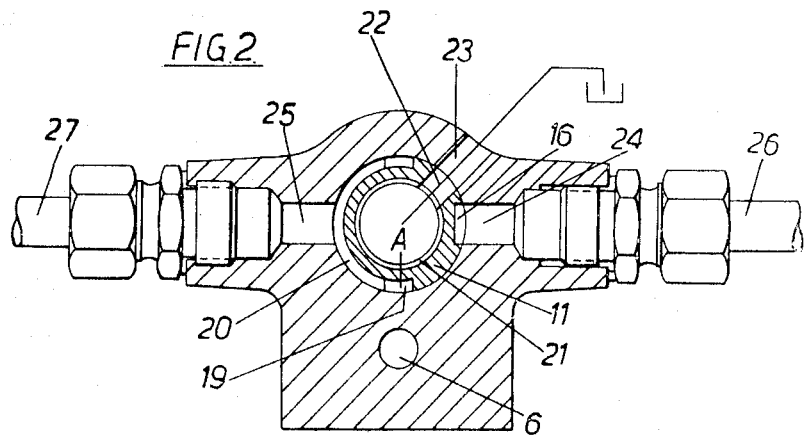
FIGS. 2 to 4 are cross sections on the arrows II, III and IV in FIG. 1.
Figure 3:
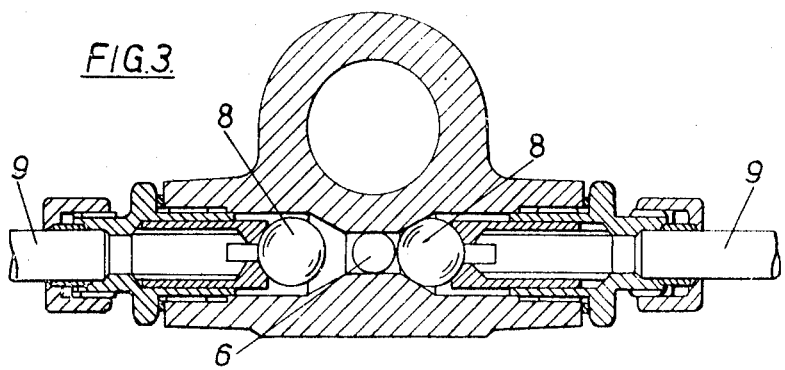
Figure 4:
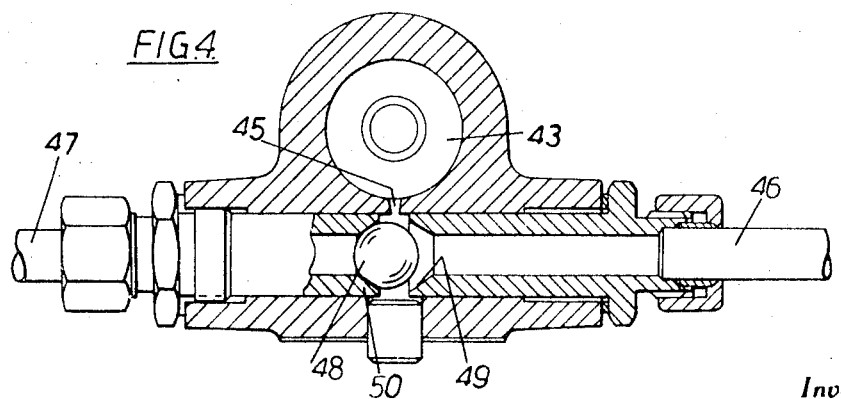

Referring now to the drawings, a distribution and sequencing valve 1 is adapted to receive hydraulic oil through an inlet port 2 from a supply pump 3 which draws oil from a sump 4. The sequencing valve 1 is adapted to distribute oil to control valves operative to control separately the endless tracks, a self-laying track or crawler vehicle. FIGS. 2, 3 and 4 each show two side connections to the sequencing valve 1, one of each two being associated with the left-hand control valve and the other with the right-hand control valve 5.

Figure 1:
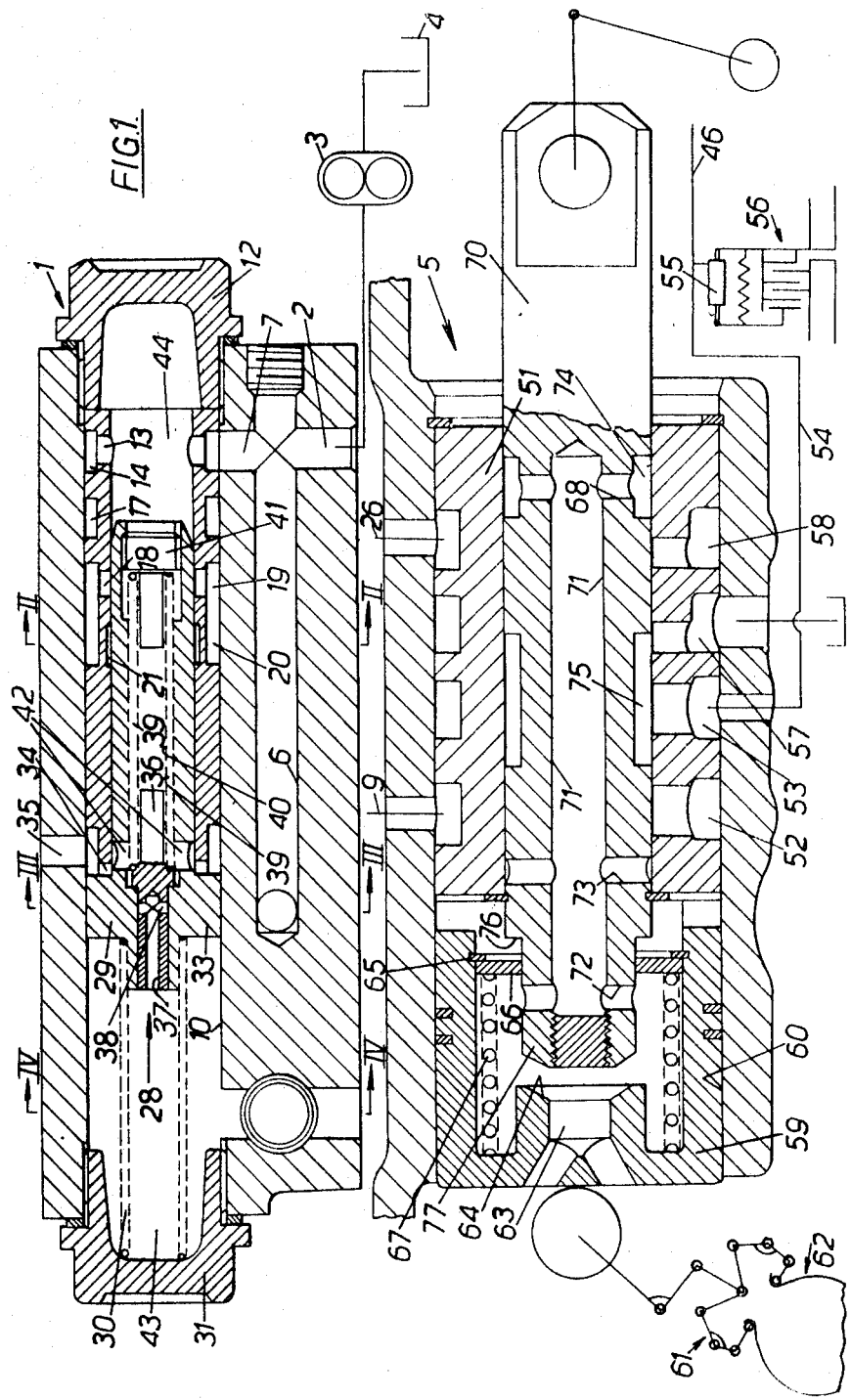
FIG. 1 is a cross section through two valves and a diagrammatic illustration of clutches and brakes controlled by the valves, in connection with one of the tracks of a crawler vehicle.

Control valve 5 shown in FIG. 1 is associated with the right-hand track. The left-hand control valve is the same in construction and operation and has not been shown.

Supply of pressure fluid to the bores of all valves is through passage means as follows. Port 2 opens into two supply passages 6 and 7. Passage 6 ends (See FIG. 3) in two check valves 8 which, when opened, permit oil to flow into respective pipe lines 9 to the bores of control valves 5. Passage 7 introduces fluid into a bore 10 in valve 1.

The bore 10 in sequencing valve 1 provides a mounting for a stationary sleeve 11 closely fitting therein so that channels formed on the exterior of the sleeve define separate galleries or conduits when the sleeve is inserted into the bore 10 in its proper position. An end cap 12 holds the sleeve in its proper position. The galleries or conduits are therefore identified as such on the understanding that the sleeve 11 and the body of valve 1 define them.

Figure 5:
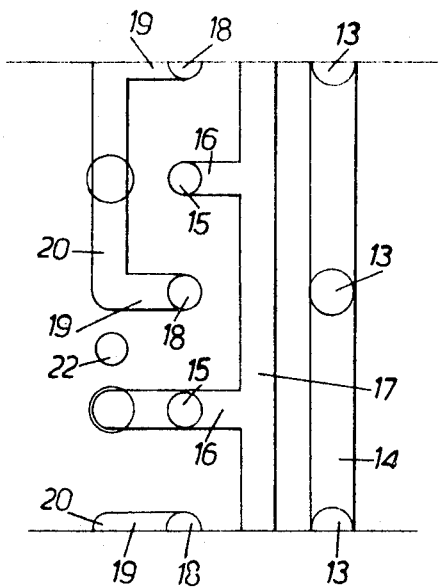
FIG. 5 is a developed plan of the channels in the sleeve in the sequencing valve and is developed from a hypothetical axial cut at A in FIG. 2.

With reference to FIG. 5, holes 13 in the sleeve intersect circumferential channel 14. Holes 15 in the sleeve enter axial channels 16 which lead to full circumferential channel 17. One of the channels 16 extends axially to section II. Holes 18 enter axial channels 19 which lead to a part-circumferential channel 20.

A gallery 21 in the inner surface of the sleeve 11 opens through aligned holes 22 and 23 in the sleeve 11 and the valve body, respectively. Because the sequencing valve is located in an enclosed space, the floor of which constitutes a sump, the oil passing through holes 22 and 23 simply leaks into the sump.

Two ports 24 and 25, FIG. 2, open into the valve body to connect with channels 16 and 20, respectively. Pipe lines 26 and 27 connect ports 24 and 25 respectively to the illustrated control valve 5 and the other identical control valve, not shown.

The remainder of the bore 10 holds a pilot relief valve 28. This consists of a stepped plunger 29 slidable in the bore 10 and in the bore of the sleeve 11. The plunger 29 is urged in a rightward direction by a spring 30 located between it and the end cap 31. The right-hand end of plunger 29 is tapered to provide progressive opening of holes 15, 18 and 21. The larger diameter end 33 of the plunger 29 abuts the end of the sleeve 11 and apertures 34 are provided in the end of the sleeve 11 to permit communication with a drain hole 35 in the sequencing valve body.

A stepped relief-valve insert 36 is slidable within the plunger 28 and this is blind-bored axially at 37 and through-bored transversely at 38 to provide a flow passage. The plunger 28 is itself provided with a stepped bore 39 to receive the valve insert 36 and a spring 40 is adapted to urge the steps on the valve insert 36, and the bore 39 into abutment. Spring 40 is held in position by a plug 41 screwed into the right-hand end of plunger 28. Cross holes 42 permit the interior of the plunger to communicate with drain 35.

The space between the plunger 28 and the end cap 31 is to be known for convenience as the pressure-sensing space or chamber 43 and that between the plunger 28 and the end cap 12 is to be known for convenience as the pump-pressure space or chamber 44. As seen in FIG. 4, the pressure-sensing space can be connected through drilling 45 to either of pipe lines 46 and 47. A ball valve 48 acts to seat on valve seatings 49 and 50 to prevent communication between one of the lines 46 and 47 and the space 43.

Reverting to FIG. 1, the control valve 5 has a fixed valve block 51 with a series of galleries. Sincle full lines indicate the pipes which communicate with these galleries.

Gallery 52 communicates through pipe 9 and passage 6 with pump 3.

Passage means comprising gallery 53, pipe 54 and pipe 46 connect the hydraulic declutch actuator or operator 55 of a spring-engaged steering clutch 56 shown diagrammatically in FIG. 1 with chamber 43.

Gallery 57 communicates with the sump.

Gallery 58 communicates through pipe 26 with the sequencing valve at port 24, FIG. 2 and together comprise a passage means.

The brake operator comprises a piston 59 movable in a bore 60, which holds the valve block, and adapted to move to the left and actuate a series of linkages and levers 61 to apply a brake 62, shown diagrammatically, which is associated with the steering clutch 56. The piston crown is provided with a bifurcated relief port 63, connected to sump, which opens to a valve seating 64. A spring clip 65 holds a spring retainer 66 in position and a spring 67 is located between the latter and the underside of the piston crown.

A control plunger 70 is slidable in the valve block 51 under the action of a lever and link mechanism connected to a control handle or pedal. The plunger has a plugged blind bore 71 opening adjacent each end into transverse through-bores of which those adjacent one end of the bore are denoted 72 and 73 and that adjacent the other end of the bore is denoted 68. Through-bore 72 opens into the interior of piston 59 and bore 73 comprises a passage communicating fluid behind piston 59 for brake actuation when the control plunger 70 is moved sufficiently to the left. Through-bore 68 opens into a gallery 74 formed in the outer surface of the plunger. A wide gallery 75 is also formed on the exterior of the plunger 70. A shoulder 76 on plunger 70 is arranged to make contact with the spring retainer 66 on movement of movement of the plunger to the left. Also the nose 77 of the plunger is shaped to seat on the valve seating 64 and close the port 63 on leftward movement of the plunger 70 and close the passage means comprising bores 71, 72 and port 63 to passage of fluid to sump.

The described embodiment of the invention operates as follows on the assumption that on control handle or pedal actuates its own control valve 5 and that there is a clutch 56 and brake 62 associated with each track, there being no differential gear in the transmission, and a single sequencing valve 1 being common to both control valves 5. One control handle or pedal shall produce the following results. In the position of rest the clutch shall be fully engaged and the brake fully off; in an intermediate position of control travel the clutch shall be fully disengaged and and the brake fully off; in the full position of control travel the clutch shall be fully disengaged and the brake fully on. Hence with the engine driving the pump at a sufficient speed to produce an adequate flow of oil, and the valve 5 in the position of rest as shown, the oil from the pump is flowing into port 2, along passage 6 and pipe 9 to galleries 52 where it is blocked. Consequently pressure builds up in pressure space 44 and drives the relief valve plunger 29 to the left to uncover gallery 21 and allow spillage of oil through passages 22 and 23 to sump (FIG. 2). At this time gallery 75 bridges galleries 53 and 57 in valve block 51 (FIG. 1) and vents the declutch actuator 55 to pressure-sensing space 43 through pipe 46.

When control plunger 70 is moved to the left, the shoulder 76 engages spring retainer to provide a physical indication that clutch release has begun. In this position of plunger 70, the gallery 75 bridges galleries 52 and 53 and allows oil from pump 3 through port 2, passage 6 and pipe 9 to flow to the declutch actuator 55 through pipe 54, and through pipe 46 to the pressure-sensing space 43. The pressure builds up in the actuator 55 and in space 43 where it acts on the larger area on the end of the relief-valve plunger 29 and moves the latter to the right closing drainage of space 44 to sump through port 20 and passages 21,22,23. Meantime gallery 74 is in register with gallery 58 and oil passes from pressure space 44 through the open holes 15, gallery 17 (FIG. 5) channel 16, port 24 and pipe 26 to gallery 58, FIG. 1. From there it flows through gallery 74, bore 68, bore 71, bore 72, and port 63 to sump. Accordingly, pressure space 44 is vented and the pressure in space 43 tends to drive the whole of the relief valve plunger 29 to the right until a balance is struck between the pressures in spaces 44 and 43 and the flow out of space 44 is throttled by the tapered nose of plunger 29 into hole 15. Subsequently the valve insert 36 is moved by increasing pressure in space 43 caused by the clutch apply springs until oil is vented through passages 37, 38, 34 and 35. When this happens declutch actuator 55 has fully disengaged clutch 56 so that there is no drive to the track controlled by it.

When plunger 70 of control valve 5 is moved even further to the left, the shoulder 75 contact with spring retainer 66 and compresses spring 67 and urges piston 59 to the left to begin to manually apply the brake 62. This movement of plunger 70 closes the nose 77 on to valve seating 64, prevents escape of oil through port 63, and allows oil flowing through bores 73 to build up a pressure behind the piston to cause it to apply the brake 62 more strongly. The build up of pressure behind the piston is felt at the pressure space 44, thus causing the relief-valve body 29 to be displaced to the left by a greater or lesser amount. Flow through relief-valve insert 36 increases to compensate until a balance is again achieved. The build up of pressure behind the piston 59 also causes a back pressure on the plunger 70 so that the operator feels an increasing hand or foot pressure as the brake handle or pedal is progressively moved. If the brake is fully applied, the pressure in space 44 moves the relief-valve plunger to the left until gallery 21 is uncovered and oil can leak out through holes 22 and 23 to sump.

In the event of a loss of oil supply, the plunger 70 moves the piston 59 mechanically to apply the brakes.

While control valve 70 is in the first aforementioned leftward position, with shoulder 76 engaging retainer 66, the brake cannot be applied because the pressure oil in bore 71 and behind piston 59 is vented through clearance between plunger nose 77 and seat 64 and out through port 63 to sump. Even if control valve 70 is initially moved fully leftward to engage nose 77 and seat 64 to cut off flow therethrough to sump before the clutch is fully disengaged, the brake will not apply until clutch disengagement is completed. This occurs because the force resulting from pressure acting on the small diameter right end nose of plunger 29 is substantially less than the force resulting from pressure acting on the large diameter left end 33 of plunger 29 plus the force exerted by spring 30. Thus flow to bore 71 is severely throttled and a significant pressure differential between declutch and brake-apply exists until the clutch is fully disengaged, whereupon relief valve 36 opens, eliminating the differential pressure area between the left and right ends of plunger 29 and dropping the pressure in space 43 below that in space 44. Then plunger 29 moves leftward, opening ports 15 fully and rapidly pressurizing bore 71 to apply the brake.

Thus the invention provides a system wherein a brake cannot normally be applied until the corresponding clutch has been disengaged.

From FIG. 2 it will be seen that, when both brakes are applied, the same pressure is made available at ports 24 and 25 to enable equal intensity of brake application.

I claim:

1. A hydraulic control mechanism for sequentially operating hydraulic clutch and brake operators to sequentially operate a clutch and a brake, including valve body means having first and second bores; a manually operated first plunger slidable in the first bore and having a first position for effecting pressurization of the clutch operator, a second position for effecting pressurization of the brake operator and a third position effecting depressurization of both said operators; a hydraulically operated second plunger slidable in the second bore to divide the second body into first and second chamber; first passage means connecting the first bore with the clutch operator and the second chamber; second passage means connecting the first bore with the brake operator; third passage means connecting the first bore with the first chamber; a source of pressure fluid including a sump; fourth passage means connecting the source with the first bore with the first chamber; fifth passage means connecting the first bore with sump; gallery means on the first plunger for connecting the first and fourth passage means in the first and second positions of the first plunger to pressurize the clutch operator, for connecting the second and third passage means to enable pressurization of the brake operator in first and second positions of the first plunger, and for disconnecting said passage means to effect depressurization of both said operators in said third position thereof; valving means associated with the first plunger for connecting the second and fifth passage means to effect depressurization of the brake operator in the first and third positions of the first plunger and for disconnecting said passage means to enable pressurization of the brake operator in the second position thereof; biasing means biasing the second plunger to a first position disconnecting the third and fourth passage means to prevent enable pressurization of the brake operator, the second plunger being responsive to pressure fluid in the first chamber to move to a second position connecting the third and fourth passage means to enable pressurization of the brake operator and being responsive to pressure fluid in the second chamber to move between the first and second positions to throttle fluid flow into the third passage means; and relief valve means in the second chamber responsive to a predetermined pressure sufficient to operate said clutch to relieve pressure in the second chamber and enable pressure in the first chamber to shift the second plunger to the second position to deliver pressure fluid to the second passage means for selective operation of said brake in response to positioning of the first plunger.

2. The hydraulic control mechanism of claim 1, including sixth passage means connecting the first chamber to sump, the second plunger being responsive to pressure fluid in the first chamber to move to a third position opening the sixth passage when the first plunger is in third position.

3. The hydraulic control mechanism of claim 1, including biasing means operable upon movement of the first plunger to first position and beyond to third position to oppose such movement of the first plunger.

4. The hydraulic control mechanism of claim 1, including seventh passage means connecting the first bore to sump, said gallery means connecting the first and seventh passage means in the third position of the first plunger and disconnecting said passage means in the first and second positions thereof.

5. The hydraulic control mechanism of claim 1, wherein the second plunger has a first pressure area exposed to the first chamber and a second larger pressure area exposed to the second chamber, so that equal pressure in both chambers effect movement of the second plunger toward first position.